Feb. 20, 1945.  H. M. BACON  2,369,636
METHOD AND APPARATUS FOR MOLDING LOOP PICKERS
Filed Dec. 31, 1942  2 Sheets-Sheet 1
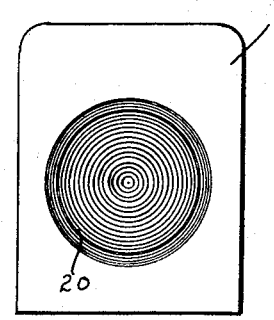
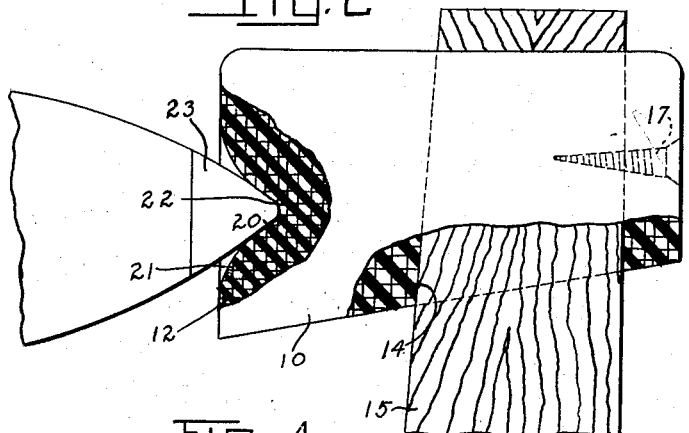
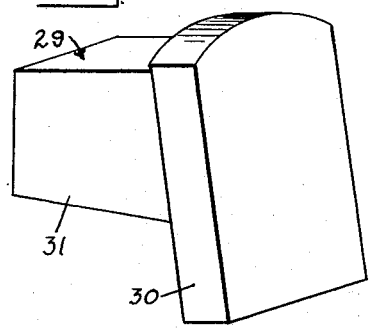
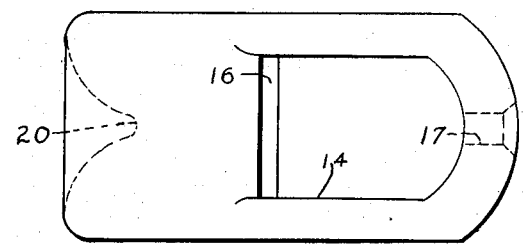
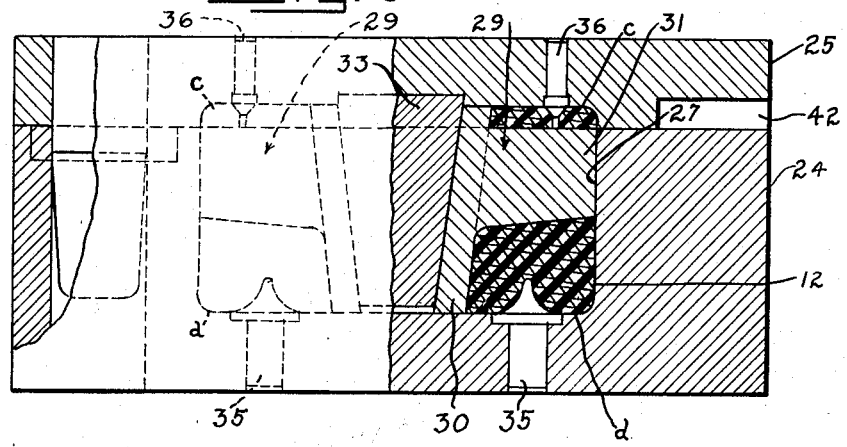
INVENTOR
HENRY MILES BACON
BY
ATTORNEYS Feb. 20, 1945.   H. M. BACON   2,369,636
METHOD AND APPARATUS FOR MOLDING LOOP PICKERS
Filed Dec. 31, 1942   2 Sheets-Sheet 2
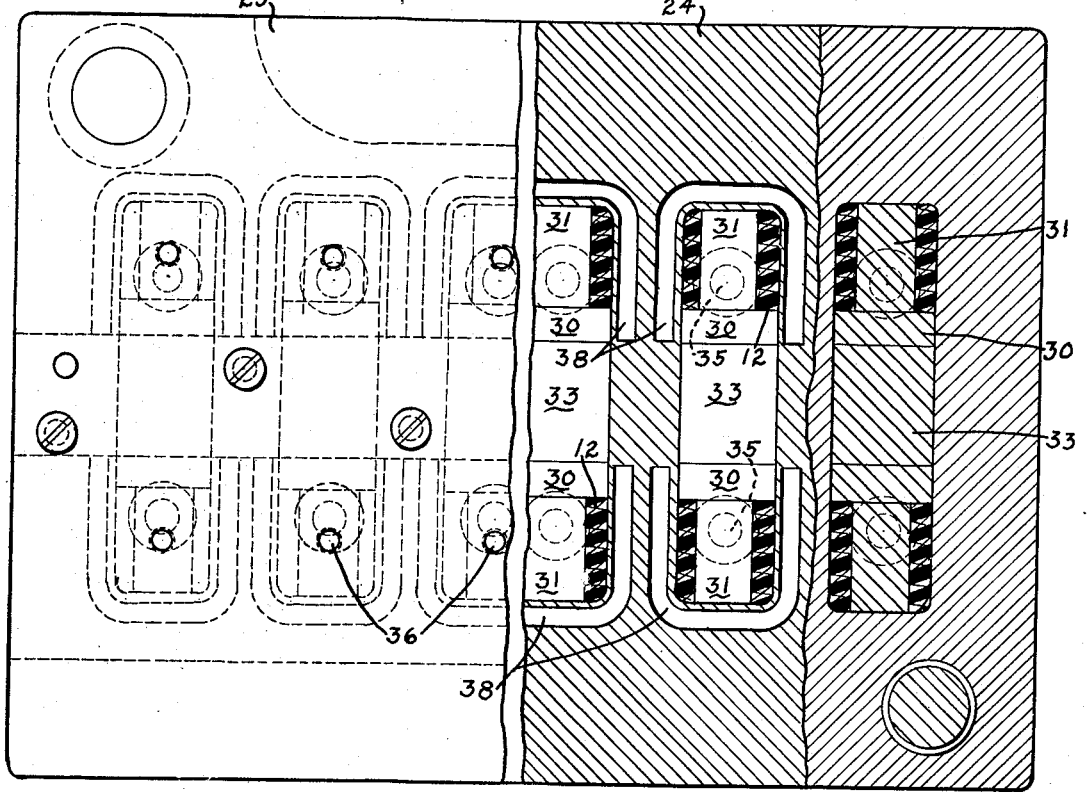
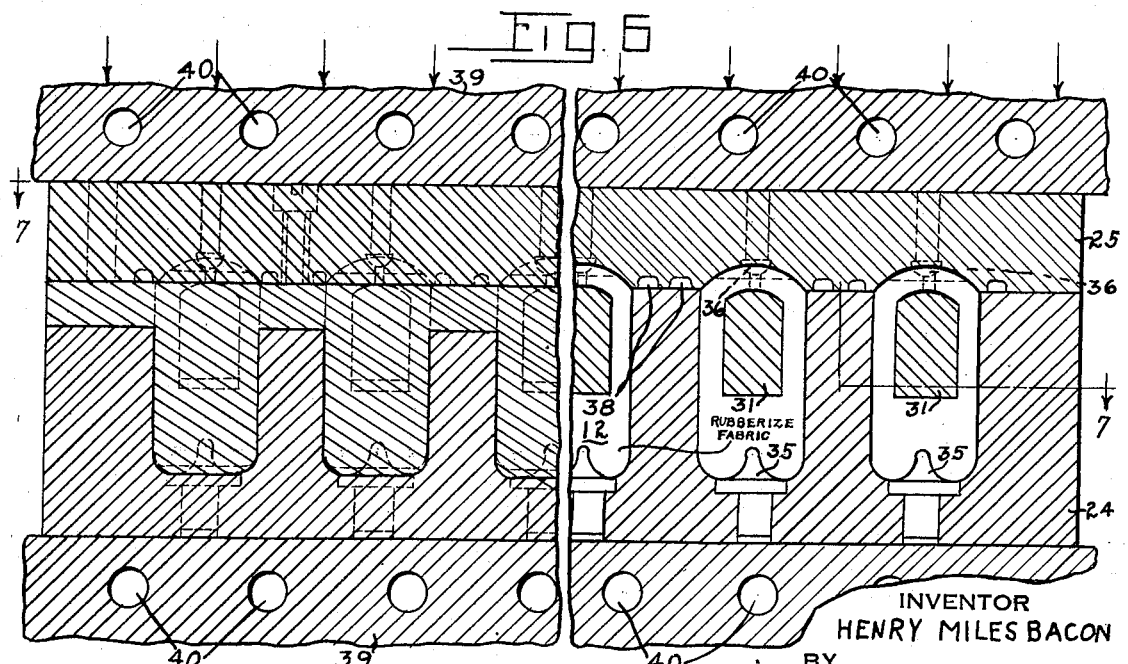
INVENTOR
HENRY MILES BACON
BY
ATTORNEYS Patented Feb. 20, 1945

2,369,636

UNITED STATES PATENT OFFICE 2,369,636

METHOD AND APPARATUS FOR MOLDING LOOP PICKERS

Henry Miles Bacon, Dayton, Ohio, assignor to The Dayton Rubber Manufacturing Company, Dayton, Ohio, a corporation of Ohio Original application May 31, 1941, Serial No. 396,035. Divided and this application December 31, 1942, Serial No. 470,869

6 Claims. (Cl. 18—42)

This application is a division of my copending application Serial No. 396,035, filed May 31, 1941.

My invention relates to improvements in textile machinery, and more particularly loom pickers.

It is a principal object of this invention to provide a molded loop picker which is substantially free from any tendency to build up static to attract the fibers.

Another object of this invention is to devise an improved method of molding pickers to eliminate the necessity of trimming the picker with the development of rough spots which would catch and damage the fiber being woven.

Another object is to provide an improved molded picker which is so designed that the shuttle point contact hole comprises uniformly smooth convex walls causing a positive centering of the shuttle when brought in contact therewith and wherein during use no sharp rim-like edges or corners are developed.

Another object is to provide an improved loop picker which is symmetrically molded along both the front and top sides to form a very smooth and even surface which will not catch or snag the finest thread being processed.

Another object is to provide an improved loop picker wherein the picker stick hole easily conforms to warped sticks and the design of the picker is such that it is adapted for use with all types of shuttles making it a more versatile picker.

A further object of the present invention is to provide an improved mold wherein loop pickers may be produced according to the method of the present invention.

These and other objects and advantages will become apparent from the following description taken in connection with the drawings, wherein Figure 1 is a front elevational view of a loop picker made according to my invention illustrating the shape and location of the self-centering shuttle point contact hole;

Figure 2 is a side elevational view, partly in section, illustrating a loop picker made according to this invention mounted on a picker stick and shown in contact with a shuttle;

Figure 3 is a perspective view of a loop picker core on which the built-up picker is positioned for inserting in the mold;

Figure 4 is a bottom view of a loop picker as illustrated in Figures 1 and 2;

Figure 5 is a view, partly in section, and illustrating an improved mold for shaping and curing one or more loop pickers made according to my invention;

Figure 6 is a fragmentary sectional view taken through the mold at different levels and illustrating the manner of holding the mold halves together and heating the parts, a portion of the mold halves being broken away and shown in section through the picker mold cavity to show the construction more clearly;

Figure 7 is a combined plan and sectional view taken substantially on the line 7—7 of Figure 6 and looking in the direction of the arrows.

In general, it has been found that with the use of increasing volumes of rayon and other synthetic fibers in the making of woven fabrics and the like, the weaving loom has become a cleaner and smoother running machine. This has been brought about not only because of the finer finish and more delicate color of fabrics which are woven but on account of the extreme sensitivity of these fibers to injury, particularly with respect to rayon filaments. The use of rayon has necessitated the improvement in pickers so as to make them substantially free from rough spots and sharp edges or the development thereof during their use in order to prevent the fibers becoming snagged or caught by these surfaces which would result in breakage or damage to the filaments. This has been accomplished with some degree of success on leather pickers by the use of very smooth tannage leathers which have been trimmed and polished with wax. Smooth tannage leathers, however, have a very short life and in some mills pickers made of this material are required to be changed with every warp beam.

Pickers made of rubber have not been so readily adapted to rayon weaving heretofore because natural rubber and rubber composition have the property of developing a high degree of static charge on their surfaces and this attracts the fibers to the picker interfering with the proper operation of the loom. Further, in the methods of making molded pickers heretofore, it has been necessary to trim the molded picker along the face and this left rough spots and exposed fiber ends which tend to snag the threads of the material being woven. Aside from this, the usual type of picker having the conventional shuttle hole used for cotton weaving has been found to be generally unsatisfactory for weaving rayon and the like synthetic silk filaments. This is due to the fact that the conventional shuttle contact hole of the pickers has a sharp outer rim which is easily nicked or frayed presenting a surface upon which fine filaments of thread which are being woven are readily caught. Further, as the conventional picker stick hole wears it retains this sharp outer rim which is undesirable.

Rayon looms require very fine adjustments and pickers must have the same fit and position in order to provide the proper operation of the loom.

A chief cause of trouble on conventional rubber molded pickers is the tendency of the fabric plies to "turn under" when driven on a heavy picker stick resulting in a distorted mounting of the picker. Further, the plies in contact with the surface of the picker stick are torn loose by the stick and roll under it causing "bumps," setting up excessive strain on the loop and shortening the life of the picker. Aside from this, the rolled under fabric unbalances the picker and brings about the setting up of a rocking motion of the picker during operation causing improper shuttle throw.

The use of pastel colors and high grade white filaments or threads has created the demand for a picker which will not shed black or objectionable dark dust particles. The conventional picker made of black or dark material has been objectionable because of the colored dust-like particles which are very often formed and transferred to the fine fabrics being woven.

My invention avoids the aforementioned difficulties and provides an improved picker which can be used for weaving rayon, silk and other fine filaments.

Referring to the drawings in detail, there is illustrated one embodiment of my invention wherein a molded loop picker is illustrated at 10. The picker is formed of synthetic rubber bonded fabric molded and vulcanized to a unitary picker. The static developing properties of the picker are reduced to a minimum by providing a covering of static-free material vulcanized to a very smooth finish having rounded corner surfaces. Light colored rubber or similar substance vulcanizable to a tough resilient material is used for making the picker, such as disclosed in my prior Patent No. 2,149,568. Other suitable oil resistant synthetic rubber compositions may be used, such as disclosed by the examples in the patent applications of Joseph Rockoff, Serial No. 349,517, filed August 2, 1940 and Serial No. 379,867, filed February 20, 1941.

The body of the picker, as shown in Figure 2, comprises laminated synthetic rubber bonded fabric 12 which is compressed and molded to the desired picker shape. The loop picker illustrated is provided with a picker stick hole 14 to receive the picker stick 15 and the bottom of the picker forming the picker stick hole is flared outward, as shown at 16, so that the picker can be readily driven onto a picker stick without tearing or rolling under the laminated fabric portion adjacent the edges of the hole. A tapered picker stick hole is formed and an aperture 17 is molded in the rear side of the picker opposite the shuttle point contact for receiving a counter-sunk screw or other suitable means for fastening the picker onto the picker stick after it has been driven thereon.

In my improved picker a shuttle contact hole 20 is molded in the face of the picker and the walls of the shuttle contact hole are arcuate, as shown at 21, forming a circular convex shuttle hole having a central depression 22 for receiving the point of the shuttle, as shown in Figure 2 at 23. The uniformly smooth convex walls of the shuttle contact hole effect a positive centering of the shuttle each time the same is brought in contact with the picker. Due to the symmetrically molded convex side walls of the shuttle contact hole no sharp edges are formed as the picker is worn.

In making my molded loop picker a novel mold is used to shape the picker so as to compress the laminated fabric layers together to form a very dense, hard, wear resistant picker having a continuous surface which is smooth and free from sharp edges and corners. This has been accomplished by providing a mold, such as illustrated in Figures 5, 6 and 7. The mold comprises two halves 24 and 25 which when closed provide a rectangular shaped cavity 27 which accommodates two pickers arranged on individual cores, generally designated 29. The picker mold core members comprise a base or backing portion 30 having an integral depending portion 31 which is of a shape to form a tapered picker stick hole. The core member 29 is provided with rounded corners and shaped to mold the picker so as to provide the flared bottom wall portions 16.

The built-up picker is placed on the cores 29 and arranged back to back in the mold cavity 27 and a V-shaped wedge member 33 is wedged between the opposed core back portions 30, as shown in Figure 5. The mold is then closed by placing the mold half 25 in position. The wedge 33 forces the opposed core members 29 apart until the end portions 31 contact the outer wall of the mold cavity and are in the position shown in Figure 5. The width of the mold is preferably designed to accommodate two pickers but it will be understood that a similar design mold of a larger capacity may be used and any desired length of mold for accommodating multiple pairs of pickers may be utilized, such as illustrated in Figures 6 and 7.

The mold halves 24 are provided with suitably shaped insert members 35 for molding the shuttle hole in the face of the picker. Similarly the mold half 25 retains the insert member 36 which is positioned to form the aperture on the rear side of the picker to receive the means 17 for fastening the picker to the picker stick.

Further, suitable overflow passageways 38 are formed at the top of the mold half portion 25 so as to receive any overflow of material during the molding of the picker.

As shown in Figure 6, the mold halves are suitably pressed together by the heated members 39 which are provided with passageways 40 for circulating heating fluid, such as steam or hot water, so as to heat the mold and associated parts. Sufficient pressure is applied to the mold to maintain the mold halves in the position shown in Figure 5 until the vulcanization has been accomplished. Thereafter the pressure is relieved and the mold halves pried apart by inserting a tool or other suitable means in the aperture 42 between the mold halves.

This unique picker mold design not only permits the loading of the mold with a minimum of strain on the picker but enables positive pressure to be applied on both the back and bottom of the picker, as shown at c and d instead of only along the back side c as has been the conventional practice heretofore. This makes it possible to use a wider unvulcanized picker and a lower compressive force applied at c which results in substantially eliminating the formation of distorted or torn loop plies which has been encountered in the molding of pickers before my invention. My improved method forms a symmetrically molded picker having smooth rounded even surfaces along both the front and top sides of the picker so that the finest threads will not adhere thereto.

My improved picker does not throw off dark dust particles because it is made of very light colored, clean rubber and fabric. The picker made according to my invention has been found to have unexpected durability and is free from rough and sharp corner surfaces which would injure fine thread coming in contact therewith. Various sized pickers which are adapted for use on regular and heavy duty looms may be made according to my invention.

It will be understood that while I have described and illustrated certain embodiments of my invention, it is not my intention thereby to limit my invention to the particular details of construction, arrangement of parts, materials, procedure and proportions herein described and illustrated in the annexed drawings, inasmuch as my invention may be modified according to individual circumstances or conditions without departing from the spirit of this disclosure and the scope of the appended claims.

I claim:

1. An improved mold for forming loop pickers comprising a bottom and top mold member, and picker receiving core members, said bottom mold member comprising an insert member for molding a shuttle hole in the face of the picker; said top mold member comprising an insert member to form an aperture on the rear side of the picker for fastening it to the picker stick, said core members each comprising a picker stick hole shaping portion and an integral base upon which the built-up picker body portions are adapted to be mounted for insertion in the mold cavity, said base of said core member forming a movable side mold member which cooperates with said bottom and top mold members to complete the mold cavity, and means for exerting pressure for shaping the built-up picker body within the cavity, said mold cavity being shaped so as to form a picker having a smooth outer surface which is free from sharp corners and rough sections which would catch and retain filaments or fibers being processed.

2. An improved mold for forming molded loop pickers comprising bottom and top mold halves which have the desired shaped mold cavity therein said bottom mold member comprising an insert member for molding a shuttle hole in the face of the picker; said top mold member comprising an insert member to form an aperture on the rear side of the picker for fastening it to the picker stick, individual loop picker core members, said core members each comprising a base and integral picker stick hole shaping portion, said base of said core member forming a movable side mold member which cooperates with said bottom and top mold members to complete the mold cavity, and a V-shaped mold element for insertion between the bases of said core members when arranged back to back in said mold cavity for spreading said core members apart while in said mold to make the picker body portion conform to the shape of the mold cavity.

3. An improved mold for forming molded loop pickers comprising bottom and top mold halves which have the desired shaped mold cavity therein said bottom mold member comprising an insert member for molding a shuttle hole in the face of the picker; said top mold member comprising an insert member to form an aperture on the rear side of the picker for fastening it to the picker stick, individual loop picker core members, said core members each comprising a base and integral picker stick hole shaping portion, said base of said core member forming a movable side mold member which cooperates with said bottom and top mold members to complete the mold cavity a V-shaped mold element for insertion between the bases of said core members when arranged back to back in said mold cavity for spreading said core members apart while in said mold to make the picker body portion conform to the shape of the mold cavity, and means for holding the mold halves together and applying heat to the same for curing the molded pickers to form a hard resilient smooth surface picker.

4. An improved method of molding a plurality of loop pickers to form a hard resilient wear resistant picker comprising building up the body of the picker from a synthetic rubber bonded laminated fabric, placing the built-up body on a core member to form a picker stick hole of the desired dimensions, introducing pairs of said built-up pickers mounted on said core members into a mold cavity, said core members being arranged back to back in the mold cavity, and compressing said built-up pickers in the mold by spreading the pairs of picker core members apart so as to compress the body of the picker against the adjacent walls of the mold cavity and form a picker having a continuous smooth hard outer surface with rounded corners.

5. An improved method of molding multiple pairs of loop pickers comprising the steps of (a) building up a picker body of rubber bonded laminated fabric to form a picker having a loop to receive a picker stick; (b) mounting said built-up picker body with its loop around a core member; (c) placing the pairs of said built-up picker bodies while mounted on their individual cores in a mold cavity arranging the same back to back; (d) spreading the picker mounted core members apart so as to compress the built-up picker body members in the mold; and (e) vulcanizing the thus compressed picker members to produce a picker having a smooth continuous outer surface which is wear resistant and substantially free from any tendency to catch and retain fiber filaments.

6. An improved mold for forming loop pickers comprising mold members having mold cavities therein, picker receiving core members, said core members each comprising a picker stick hole shaping portion and an integral base upon which the built-up picker body portions are adapted to be mounted for insertion into the mold cavity, said base of said core member forming a movable side mold member which cooperates with said bottom and top mold members to complete the mold cavity, and means for exerting pressure for shaping the built-up picker body within the cavity, said mold cavity being shaped so as to form a picker having a smooth outer surface which is free from sharp corners and rough sections which would catch and retain filaments or fibers being processed.

HENRY MILES BACON.